United States Patent [19]

Nagata et al.

[11] 4,137,293

[45] Jan. 30, 1979

[54] PRODUCING GYPSUM AND MAGNETITE FROM FERROUS SULFATE AND SEPARATING

[75] Inventors: Koichi Nagata, Yokkaichi; Kokichi Miyazawa, Suzuka; Takeshi Sato; Masashi Tsuchimoto, both of Yokkaichi; Junichi Kawashima, Koka, all of Japan

[73] Assignee: Ishihara Sangyo Kaisha, Ltd., Osaka, Japan

[21] Appl. No.: 862,438

[22] Filed: Dec. 16, 1977

[51] Int. Cl.² .................. C01F 11/46; C01G 49/08
[52] U.S. Cl. .................. 423/140; 423/146; 423/161; 423/166; 423/152; 423/632; 423/DIG. 2; 423/555
[58] Field of Search ............. 423/140, 142, 147, 632, 423/637, DIG.1, DIG. 2, 151, 146, 152, 177, 166; 134/13

[56] References Cited

U.S. PATENT DOCUMENTS

| | | | |
|---|---|---|---|
| 1,894,184 | 1/1933 | Loomis | 423/637 |
| 3,261,665 | 7/1966 | Rathmell | 423/DIG. 1 |
| 3,375,066 | 3/1968 | Murakami et al. | 423/142 |
| 3,617,562 | 11/1971 | Cywin et al. | 423/DIG. 2 |
| 3,931,007 | 1/1976 | Sugano et al. | 423/632 |
| 3,970,738 | 7/1976 | Matsui et al. | 423/140 |

*Primary Examiner*—Brian Hearn
*Attorney, Agent, or Firm*—Cushman, Darby & Cushman

[57] ABSTRACT

Gypsum and magnetite which are both coarse and of good quality can simultaneously be produced by introducing calcium carbonate into an aqueous solution containing ferrous sulfate while an oxidizing gas is blown, and then carrying out a neutralizing and oxidizing operation at a pH of 5-6 and a temperature of 60-80° C, and can be separately recovered by magnetic separation.

5 Claims, No Drawings

PRODUCING GYPSUM AND MAGNETITE FROM FERROUS SULFATE AND SEPARATING

The present invention relates to a process for producing gypsum and magnetite by neutralizing ferrous sulfate or a waste sulfuric acid containing ferrous sulfate with a calcium reagent and then separating them as products of good quality.

Ferrous sulfate or a waste sulfuric acid containing ferrous sulfate is discharged in a large amount in the production of titanium dioxide according to sulfate process and pickling in iron and steel industry, and various processes for treating them to make harmless or recovering iron or sulfuric acid contained in them as any valuable substances have heretofore been proposed. Also, many processes for precipitating gypsum and iron oxide by neutralizing ferrous sulfate with a calcium reagent have been proposed. For example, U.S. Pat. No. 3,375,066 discloses that a waste sulfuric acid containing iron is first neutralized with a calcium reagent to a pH of 2.5 or less to produce gypsum not contaminated with iron and the separated liquor is then neutralized to a pH of 6–10 to produce low-grade gypsum and iron oxide. Also, U.S. Pat. No. 3,261,665 discloses that waste sulfuric acid pickle liquor is neutralized with lime at a temperature of 82° C. to the boiling point of the reaction mixture and at a pH of 7–8 while carrying out oxidizing operation by bubbling air therethrough to produce gypsum and magnetite which are both filterable. In these prior art processes, however, it is difficult to avoid that iron contaminates at least part of gypsum and thereby it is difficult to obtain gypsum of good quality in a high yield.

Therefore, an object of the present invention is to provide a process for producing gypsum and magnetite, which are both of good quality, simultaneously from ferrous sulfate and then separating and recovering them efficiently and separately. Another object of the invention is to provide a commercial process for converting ferrous sulfate or a waste sulfuric acid containing ferrous sulfate to valuable substances. Another object of the invention is to provide an improved process for producing gypsum and magnetite, which are both of good quality, as a low cost. The other objects and advantages of the invention will be apparent from the following description.

According to the present invention, there is provided a process for producing gypsum and magnetite which comprises introducing a calcium reagent into an aqueous solution containing ferrous sulfate while an oxidizing gas is blown thereinto and then separating and recovering the resulting gypsum and magnetite separately, characterized by using calcium carbonate as said calcium reagent, carrying out an oxidizing and neutralizing operation at a pH of 5–6 and a temperature of 60°–80° C., and carrying out separation of gypsum and magnetite by magnetic separation.

The advantages of the process of the present invention are as follows:

(1) The process of the present invention is suited to practice on a commercial scale and is economically advantageous in that gypsum and magnetite both of good quality can be separated and recovered without requiring two-stage neutralization, addition of gypsum seeds, and supply of a large amount of heat.

(2) The product gypsum is substantially not contaminated with iron in spite of the presence of a large amount of iron.

(3) The amount of middlings formed in magnetic separation, that is, the amount of fine gypsum particles containing a large amount of iron produced is very small, and the yields of product gypsum and product magnetite based on the sulfuric acid and iron contained in the starting ferrous sulfate, respectively, are high.

(4) Since substantially all of iron becomes a readily filterable precipitate, drainage can be discharged into a river or the ocean as such or after very simple after-treatment. Even if heavy metals dissolved are contained, the heavy metals are captured by magnetite and water pollution can be prevented.

The aqueous ferrous sulfate solution used in the process of the present invention is exemplified by ferrous sulfate or waste sulfuric acids containing a large amount of ferrous sulfate discharged from the step of production of titanium dioxide pigment according to sulfate process, pickling operation in iron and steel industry, etc. as well as aqueous solutions prepared therefrom. If said waste sulfuric acids are high in free sulfuric acid content, they may be used in leaching of iron ores or may be reacted with a calcium reagent, while avoiding the precipitation of iron, to form gypsum followed by separation of a solid content by filtration before the process of the present invention is applied to them. In any case, the concentration of iron is 10–100 g/l, and preferably 20–60 g/l. Of course, a small amount of a ferric ion may be contained, but it is desirable that the ferrous ion occupies at least 90% by mole of iron ions.

As the calcium reagent, calcium carbonate is used. If calcium hydroxide (slaked lime) is used as the calcium reagent, it is difficult to obtain coarse gypsum crystals and the resulting magnetite is in the form of fine crystals. As a result, it is difficult to separate gypsum and magnetite sufficiently and it is impossible to obtain gypsum of good quality in a high yield. As calcium carbonate, finely ground lime stone is generally used. It is also possible to use dolomite the calcium content of which is substantially calcium carbonate. In this case, however, light burned dolomite obtained by burning dolomite at 800°–900° C. so that only the magnesium carbonate contained therein may be converted into magnesium oxide is desirable. They are conveniently used by preparing a slurry having a calcium content of about 70 to about 120 g/l as CaO.

As the oxidizing gas, air is generally used. Oxygen-containing waste gases, oxygen gas, etc. may also be used.

Oxidation and neutralization reaction is carried out by introducing calcium carbonate into an aqueous ferrous sulfate solution while an oxidizing gas is blown thereinto. This operation may be either of usual batch type or of continuous type. The oxidizing gas is blown into the solution so that the gas may be finely dispersed in the solution. When the conversion of the reaction mixture, that is, a $Fe^{3+}$/total Fe ratio in the resulting slurry reaches 65 to 75% and substantially all of iron has been precipitated, the reaction is completed. The reaction time is generally 2–6 hours.

In the process of the present invention, the pH of the reaction liquid is maintained at 5–6, and preferably 5.4–5.6, and the temperature of the reaction liquid is maintained at 60°–80° C., and preferably 65°–75° C., during the reaction. Since calcium carbonate is used as a neutralizing agent, there is little possibility that the pH of the reaction liquid becomes 6 or more. If the amount of calcium carbonate supplied is small or the temperature of the reaction liquid is too low, however, the pH of the reaction liquid becomes less than 5. The temperature of the reaction liquid is elevated to the neighborhood of the above-mentioned temperature range by heat of reaction. In a hot season, therefore, it is often unnecessary to supplement heat. The temperature of the reaction liquid can easily be controlled by the use of a small amount of steam or a high temperature waste gas. Therefore, control of the pH and temperature of the reaction liquid is far easier than in prior art processes. If the pH or temperature is lower than the above-mentioned respective ranges, however, the resulting iron oxide precipitate consists mainly of $\alpha$-FeOOH rather than the desired magnetite and magnetic separation becomes impossible. Also, if the pH is too high, feebly magnetic iron oxide is formed and the yield in magnetic separation is remarkably reduced.

The amount of an oxidizing gas introduced during the reaction is suitably about 1 to about 8 l/min per liter of the reaction liquid in the case of air.

Also, seeds for growing crystals conventionally used in prior art production of gypsum may be used without trouble, but the use of such seeds is not essential in the process of the present invention. In this regard, the process of the present invention is simpler than prior art processes.

The slurry formed in the reaction contains magnetite of 3–20$\mu$ in particle size and gypsum in the form of coarse tabular column crystals. Here, the term "magnetite" means ferrosoferric oxide (FeO·mFe$_2$O$_3$·nH$_2$O) or a magnetic iron oxide consisting mainly of ferrosoferric oxide. Thus, the term is a generic term for strongly magnetic crystalline iron oxides. A major part of magnetite agglomerates into large particles. Therefore, coarse particle portion thereof has good magnetic attractability while fine particle portion or low specific susceptibility portion thereof becomes coarse by magnetic agglomeration in a magnetic field and is pulled by a magnet.

On the other hand, gypsum is in the form of coarse tabular column crystals. Also, the surface of the crystals is not substantially contaminated with iron under the above-mentioned reaction conditions and gypsum is not affected by magnetic force at all.

Such a product slurry can easily be separated by magnetic separation into gypsum and magnetite, which can be separately recovered. Usually, the solid content of the slurry is adjusted to 20–200 g/l and then subjected to magnetic separation by a wet magnetic separator.

For the magnetic separation, general high intensity wet magnetic separators such as rotary filter-type one (manufactured by Nippon Magnetic Dressing Co.), Jones-type one (manufactured by Klockner Humboldt dutz A.G.), HGMS-type one (manufactured by Sala International AB), HIW-type one (manufactured by Eriez Magnetics Co.), etc. may be used. Magnetic flux density in a magnetic field is set to a suitable value within the range of 1,000–15,000 gauss. Usually, a neutralized slurry is first subjected to magnetic separation at 3,000–10,000 gauss to separate the slurry into concentrates consisting mainly of magnetite and tailings consisting mainly of gypsum. The concentrates are then subjected to magnetic separation at 1,000–6,000 gauss to separate them into magnetite as the second concentrates and the second tailings (middlings). Only the first tailings or a mixture of the first tailings and the second tailings is subjected to magnetic separation at 4,000–10,000 gauss to separate them into gypsum as the third tailings and the third concentrates (middlings). If a combination of several number of such magnetic separation treatments is optionally carried out, the amount of middlings can be minimized. Further, treatments by hydrocyclones, thickners or filters can be carried out before or after the magnetic separation.

The process of the present invention has been explained above with regard to the utilization of ferrous sulfate or a waste sulfuric acid containing a large amount of ferrous sulfate, but ferrous sulfate can be added to an industrial waste water containing heavy metals such as Cr, Cd, Ni, Mn, etc. and the resulting mixture can be treated according to the process of the present invention to recover iron as magnetite containing the heavy metals captured and to purify the waste water.

EXAMPLE 1

Into a 20l-volume long vertical reactor of 25 cm in diameter equipped with a stirrer, an inlet tube for introducing steam and an inlet tube for introducing air which opens near the bottom of the reactor under a stirring blade is charged 10 l of an aqueous ferrous sulfate solution having an iron content of 55 g/l. A limestone slurry containing 135 g/l of CaCO$_3$ is added in an amount equivalent to the sulfuric acid content of the aqueous ferrous sulfate solution. The resulting mixture is stirred to effect a reaction. Meanwhile, 50 l/min. of air is blown thereinto and a small amount of a limestone slurry and steam are introduced to maintain the pH and temperature of the reaction mixture at the respective appointed values. When substantially all of iron has precipitated, the reaction is completed and a slurry containing gypsum and hydrated iron oxide is obtained.

To this slurry is added water to adjust its solid content to 50 g/l. Magnetic separation is then carried out by the use of a HIW L-4 type magnetic separator (manufactured by Eriez Magnetics Co.) at a slurry supply rate of 15 l/min and a magnetic flux density of 5,000–10,000 gauss.

For comparison, experiments using the pH and temperature of the reaction liquid outside the ranges specified in the present invention and experiments using slaked lime as the calcium reagent are carried out. The slaked lime is used in the form of a slurry containing 100 g/l of Ca(OH)$_2$ and an appropriate amount of conventional gypsum seeds are added in this case.

The conditions and results obtained of the neutralization and oxidation reaction are shown in Table 1 and the conditions and results obtained of magnetic separation are shown in Table 2. Experiment No. 1 is an example of the present invention while the other experiments are comparative examples.

Table 1

| Ex. No. | Calcium reagent | Reaction conditions | | | | Hydrated iron oxide | |
|---|---|---|---|---|---|---|---|
| | | pH | Temp. (°C) | Time (hrs) | Conversion (%) | Main composition | Shape |
| 1 | Limestone | 5.5±0.1 | 70±1 | 4.5 | 69.4 | FeO.Fe$_2$O$_3$ | Particulate |
| 2 | " | 5.5±0.1 | 55±1 | " | 70.0 | $\alpha$-FeOOH | Needle |
| 3 | " | 4.7±0.1 | 70±1 | " | 70.0 | " | " |

Table 1-continued

| | | | | | | | |
|---|---|---|---|---|---|---|---|
| 4 | Slaked lime | 8.1± 0.1 | " | 4 | 67.2 | FeO.Fe$_2$O$_3$ | Particulate |
| 5 | " | 5.9± 0.1 | " | " | 69.5 | " | " |

| Particle size ($\mu$) | Gypsum | | | |
|---|---|---|---|---|
| | Shape | Thickness ($\mu$) | Width ($\mu$) | Length ($\mu$) |
| 3–15 | Tabular column | 50–80 | 50–80 | 100–300 |
| 0.03×0.3 | " | " | " | " |
| " | " | " | " | " |
| 0.1–1 | Needle | 3–5 | 3–5 | 20–40 |
| 0.1–0.5 | " | 1–3 | 1–3 | 10–30 |

Table 2

| Experiment No. | Magnetic flux density (guass) | Separation % | | Concentrates | |
|---|---|---|---|---|---|
| | | concentrates | Tailings | Fe content (%) | SO$_3$ content (%) |
| 1 | 5,000 | 30.5 | 68.5 | 67.8 | 0.4 |
| 4 | 10,000 | 30.0 | 60.5 | 64.0 | 1.2 |
| 5 | 10,000 | 25.0 | 57.5 | 65.5 | 0.9 |

| Tailings | | | | |
|---|---|---|---|---|
| Fe recovery (%) | Fe content (%) | SO$_3$ content (%) | SO$_3$ recovery (%) | Middlings (%) |
| 98.0 | 0.2 | 45.7 | 98.0 | 1.5 |
| 92.0 | 2.2 | 44.8 | 85.5 | 9.5 |
| 78.0 | 1.8 | 44.5 | 80.5 | 17.5 |

Note:
Magnetic separation is impossible in the case of Experiments Nos. 2 and 3.

EXAMPLE 2

Into a 50 m$^3$-volume (effective volume 35 m$^3$) long vertical reactor of 4 m in diameter equipped with a stirrer, an inlet tube for introducing steam and an inlet tube for introducing air are charged 20 m$^3$ of an aqueous ferrous sulfate solution having an iron content of 50 g/l prepared from ferrous sulfate produced as a by-product in the production of titanium dioxide and 9 m$^3$ of a limestone slurry containing 200 g/l of CaCO$_3$. The resulting mixture is stirred and air is blown thereinto at a rate of 6 Nm$^3$/min to effect a reaction. During the reaction, a small amount of steam and a supplemental limestone slurry are introduced to maintain the pH and temperature of the reaction liquid at 5.5 ± 0.1 and 70°± 2° C., respectively. When the conversion of the reaction mixture has reached 70.6% after 4 hours, the reaction is completed. The resulting gypsum is in the form of coarse tabular column crystals having a length of 60–140$\mu$, a width of 20–40$\mu$ and a thickness of 20–40$\mu$ while the resulting magnetite is in the form of large particles of 3–15$\mu$ in size formed by agglomeration of many particulate crystals.

To the resulting slurry is added water to adjust its solid content to 50 g/l. The first magnetic separation is carried out by the use of a HIW CF5-type magnetic separator (manufactured by Eriez Magnetics Co.) at 5,000 gauss. The concentrates obtained in the first magnetic separation is again subjected to magnetic separation at 5,000 gauss (the second magnetic separation). The concentrates obtained in the second magnetic separation is again subjected to magnetic separation (the third magnetic separation). Thus, magnetite as concentrates and middlings as tailings are obtained. The tailings obtained in the first magnetic separation is combined with the tailings obtained in the second magnetic separation, and the combined tailings are then subjected to magnetic separation at 10,000 gauss (the fourth magnetic separation). Thus, the combined tailings are separated into gypsum as tailings and middlings as concentrates.

The resulting products have the following contents:
Gypsum: CaSO$_4$·2H$_2$O 97.5%, Fe 0.15%, SO$_3$ yield 98.0%
Magnetite: Fe 67.8%, CaSO$_4$ 0.5%, Fe yield 97.4%
Middlings: Fe 25.0%, CaSO$_4$ 49.3%, Yield 1.8%
(based on the dry total weight of solids).

EXAMPLE 3

Into the reactor as used in Example 2 is charged 20 m$^3$ of water, and steam is blown thereinto to warm the water to 70° C. Through an inlet tube which opens at the bottom of the reactor, 6–7 m$^3$/hr of an aqueous ferrous sulfate solution having an iron content of 35 g/l and 1.4–1.6 m$^3$/hr of a limestone slurry containing 300 g/l of CaCO$_3$ are introduced intermittently and in parallel with each other. Simultaneously, 6 Nm$^3$/min of air and a small amount of steam are blown to maintain the pH and temperature of the reaction liquid at 5.5 ± 0.2 and 70°± 2° C., respectively. The resulting slurry is continuously overflown through an overflow exit at the top of the reactor. The conversion of the slurry is 66.4–72.5% and a content of iron dissolved in the slurry is 0.1–0.5 g/l.

The crystals of the resulting gypsum grow with the lapse of time. The size of the crystals becomes almost constant in about 30 hours. The gypsum particles consist of a mixture of coarse tabular column crystals (200–1400$\mu$ × 80–340$\mu$ × 80–340$\mu$) and particulate crystals. Magnetite is in the form of agglomerate of particulate crystals which has a particle size of 3–15$\mu$.

The resulting slurry is first passed through a hydrocyclone and the resulting fine particle portion is then subjected to the first magnetic separation at 2,000 gauss. The coarse particle portion from the hydrocyclone is mixed with the tailings obtained in the first magnetic separation. The resulting mixture is subjected to the second magnetic separation at 10,000 gauss to separate the mixture into gypsum as tailings and middlings as concentrates. The concentrates obtained in the first magnetic separation is subjected to the third magnetic separation at 2,000 gauss to separate them into magnetite as concentrates and middlings as tailings. Thus, the whole solid content is separated into 61.3% of gypsum, 31.5% of magnetite and 7.2% of middlings. The thus obtained gypsum shows a grade of CaSO$_4$·2H$_2$O 97.5% and an SO$_3$ yield of 92.4%. Also, the thus obtained magnetite shows a grade of Fe$_2$O$_3$ 97.0% after drying at 70° C. and a Fe yield of 93.5%.

When the physical properties of the gypsum are measured, it is found that its normal consistency is 79.5% and a wet strength of 10.25 kg/cm$^2$. Thus, the gypsum is quite comparable to commercial gypsum for gypsum wallboard. Also, as for the magnetite, when it is washed with dilute hydrochloric acid containing 30 g/l of HCl, burned at 700°–800° C., and pulverized and the color and gloss as a pigment of the product is measured, it is found that it has properties similar to those of commercial iron oxide as a red pigment.

EXAMPLE 4

Dolomite is pulverized and then burned at 850° C. for one hour, and a slurry having a solid content of 100 g/l is formed therefrom. Into a 300 l-volume reactor having an almost similar shape to that of the reactor used in Example 1 is charged 200 l of the aqueous ferrous sulfate solution having an iron content of 40 g/l as prepared from ferrous sulfate produced as a by-product in the production of titanium dioxide. The aqueous ferrous sulfate solution is oxidized and neutralized with the above-mentioned dolomite slurry at a pH of 5.6 ± 0.1 and a temperature of 70° ± 2° C. When the conversion of the reaction mixture reaches 67.3%, the reaction is completed.

In the same manner as in Example 2, magnetic separation is carried out. As a result, gypsum having a grade of $CaSO_4 \cdot 2H_2O$ 97.4%, magnetite having an iron content of 67.5% and an $SO_3$ content of 0.4%, and middlings having an iron content of 6.2% and an $SO_3$ content of 41.9% are obtained in a ratio of 55.6:42.2:2.2.

What is claimed is:

1. A process for producing gypsum and magnetite which comprises introducing a calcium reagent into an aqueous solution containing ferrous sulfate while an oxidizing gas is blown thereinto and then separating and recovering the resulting gypsum and magnetite separately, characterized by using calcium carbonate as the calcium reagent, carrying out an oxidizing and neutralizing operation at a pH of 5–6 and a temperature of 60°–80° C., and carrying out separation of gypsum and magnetite by magnetic separation.

2. A process according to claim 1, wherein said calcium carbonate is ground limestone.

3. A process according to claim 1, wherein said calcium carbonate is ground light burned dolomite.

4. A process according to claim 1, wherein the oxidizing and neutralizing operation is carried out at a temperature of 65°–75° C.

5. A process according to claim 1, wherein the separation of gypsum and magnetite is carried out by a wet magnetic separator at a magnetic flux density of 1,000 to 15,000 gauss.

* * * * *